US012666438B2

(12) United States Patent
Liu

(10) Patent No.: US 12,666,438 B2
(45) Date of Patent: Jun. 23, 2026

(54) PHYSICAL DOWNLINK CONTROL CHANNEL REPETITION METHOD AND APPARATUS, AND USER EQUIPMENT

(71) Applicant: VIVO MOBILE COMMUNICATION CO., LTD., Chang'an Dongguan (CN)

(72) Inventor: Hao Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 307 days.

(21) Appl. No.: 18/477,972

(22) Filed: Sep. 29, 2023

(65) Prior Publication Data

US 2024/0032059 A1      Jan. 25, 2024

Related U.S. Application Data

(63) Continuation of application No. PCT/CN2022/085156, filed on Apr. 2, 2022.

(30) Foreign Application Priority Data

Apr. 2, 2021      (CN) .......................... 202110363014.X

(51) Int. Cl.
*H04W 72/231* (2023.01)
*H04L 1/08* (2006.01)

(52) U.S. Cl.
CPC .............. *H04W 72/231* (2023.01); *H04L 1/08* (2013.01)

(58) Field of Classification Search
None
See application file for complete search history.

(56) References Cited

U.S. PATENT DOCUMENTS

| | | | | |
|---|---|---|---|---|
| 11,464,008 B2 * | 10/2022 | Zhou | ..................... | H04L 5/0053 |
| 12,047,172 B2 * | 7/2024 | Zhang | ....................... | H04L 1/08 |

(Continued)

FOREIGN PATENT DOCUMENTS

| | | |
|---|---|---|
| CN | 104811263 A | 7/2015 |
| CN | 109392151 A | 2/2019 |

(Continued)

OTHER PUBLICATIONS

"Summary of email discussions [103-e-NR-feMIMO-02] for MTRP PDCCH Enhancements," Moderator (Qualcomm), 3GPP TSG-RAN WG1 Meeting #103-e, e-Meeting, Oct. 26-Nov. 13, 2020, R1-2009683.

(Continued)

*Primary Examiner* — Chirag G Shah
(74) *Attorney, Agent, or Firm* — Price Heneveld LLP

(57)      ABSTRACT

A physical downlink control channel repetition method and apparatus, and user equipment are provided. The PDCCH repetition method according to embodiments of this application includes: in a case that UE has received information for PDCCH repetition, determining, by the UE, X PDCCH candidates of repetition, X being an integer greater than 1; and executing, by the UE, an overbooking rule based on an assumed first blind decoding count on the X PDCCH candidates, or executing, by the UE, a target operation based on a time domain resource of a target PDCCH candidate; where search spaces corresponding to the X PDCCH candidates are associated with each other, and the target PDCCH candidate is a PDCCH candidate satisfying a predetermined condition in the X PDCCH candidates.

18 Claims, 6 Drawing Sheets

In a case that a PDCCH repetition apparatus has received Information for PDCCH repetition, the PDCCH repetition apparatus determines X PDCCH candidates of repetition — 101

102

The PDCCH repetition apparatus executes an overbooking rule based on an assumed first blind decoding count on the X PDCCH candidates The PDCCH repetition apparatus executes a target operation based on a time domain resource of a target PDCCH candidate — 103

(56) References Cited

U.S. PATENT DOCUMENTS

| | | | | |
|---|---|---|---|---|
| 12,150,152 | B2 * | 11/2024 | Park | ................... H04W 72/0446 |
| 2015/0117353 | A1 | 4/2015 | Takeda et al. | |
| 2021/0050937 | A1 | 2/2021 | Shen | |
| 2021/0144599 | A1 * | 5/2021 | Awoniyi-Oteri | ...... H04L 5/0053 |
| 2021/0168782 | A1 * | 6/2021 | Hamidi-Sepehr | ........................... H04W 72/0446 |
| 2021/0360667 | A1 * | 11/2021 | Moon | ................... H04L 5/0035 |
| 2022/0225301 | A1 * | 7/2022 | Khoshnevisan | ...... H04L 5/0094 |
| 2023/0171031 | A1 * | 6/2023 | Zhang | ................... H04W 72/23 370/329 |
| 2023/0188261 | A1 * | 6/2023 | Awadin | ................ H04L 1/1864 370/329 |
| 2023/0247640 | A1 | 8/2023 | Mu | |

FOREIGN PATENT DOCUMENTS

| | | |
|---|---|---|
| CN | 109787710 A | 5/2019 |
| CN | 111758238 A | 10/2020 |
| CN | 111819808 A | 10/2020 |
| WO | 2021026926 A1 | 2/2021 |
| WO | WO-2021224283 A1 * | 11/2021 ........... H04L 1/0038 |
| WO | WO-2021234678 A2 * | 11/2021 ........... H04L 5/0091 |
| WO | WO-2022213960 A1 * | 10/2022 ........... H04W 24/02 |

OTHER PUBLICATIONS

"Enhancements for Multi-TRP for PDCCH, PUCCH and PUSCH," Samsung, 3GPP TSG RAN WG1 #104-e, e- Meeting, Jan. 25-Feb. 5, 2021, R1-2101187.

"Multi-TRP Enhancements for PDCCH, PUCCH and PUSCH," Convida Wireless, 3GPP TSG-RAN WG1 #104-e, e-Meeting, Jan. 25-Feb. 5, 2021, R1-2101415.

"Discussion Summary for mTRP PDCCH Reliability Enhancements," Moderator (Qualcomm), 3GPP TSG-RAN WG1 Meeting #104-e, e-Meeting, Jan. 25-Feb. 5, 2021, R1-2101838.

* cited by examiner

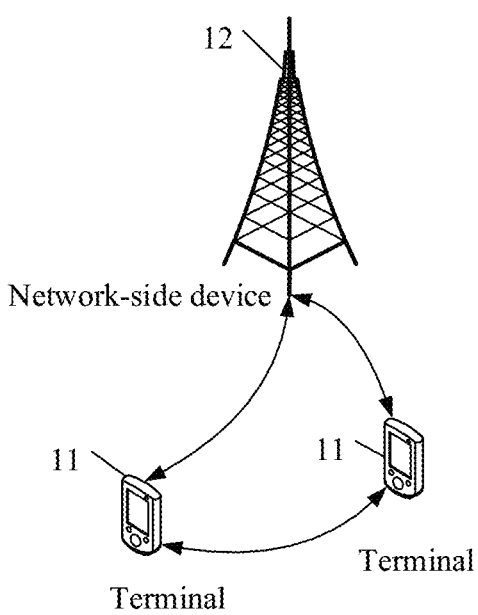

Network-side device

11 ~            11 ~

Terminal

Terminal

FIG. 1

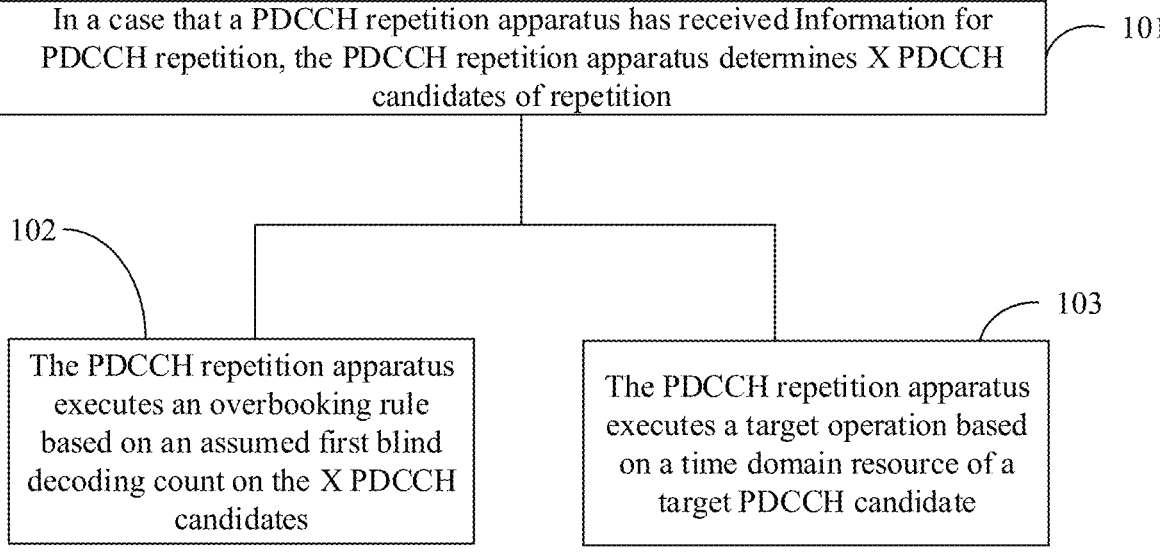

In a case that a PDCCH repetition apparatus has received Information for PDCCH repetition, the PDCCH repetition apparatus determines X PDCCH candidates of repetition — 101

102 ~

The PDCCH repetition apparatus executes an overbooking rule based on an assumed first blind decoding count on the X PDCCH candidates

103

The PDCCH repetition apparatus executes a target operation based on a time domain resource of a target PDCCH candidate

FIG. 2

PDCCH $T_{BWPswitchDelay}$

PDCCH
candidate 1

PDCCH
candidate 2

$Z+T_{BWPswitchDelay}$

PDCCH
candidate 1

PDCCH
candidate 2

Acknowledgement
information

Q symbols

PHYSICAL DOWNLINK CONTROL CHANNEL REPETITION METHOD AND APPARATUS, AND USER EQUIPMENT

This application is continuation application of PCT International Application No. PCT/CN2022/085156 filed on Apr. 2, 2022, which claims priority to Chinese Patent Application No. 202110363014. X, filed with the China National Intellectual Property Administration on Apr. 2, 2021 and entitled "PHYSICAL DOWNLINK CONTROL CHANNEL REPETITION METHOD AND APPARATUS, AND USER EQUIPMENT", the disclosure of which are incorporated herein by reference in their entireties.

TECHNICAL FIELD

This application relates to the field of communication technologies, and specifically relates to a physical downlink control channel PDCCH repetition method and apparatus, and user equipment.

BACKGROUND

To improve PDCCH transmission performance, a PDCCH repetition scheme is introduced into release 17 in 5G NR. Different repetition occasions can come from different transmission reception points TRPs, so that when one TRP experiences transmission blockage, PDCCH transmission on another TRP can still be received by a terminal, thereby improving PDCCH reliability. When decoding PDCCH repetition, the terminal uses different receiver algorithms. For example, in addition to trying to demodulate PDCCH on each PDCCH repetition occasion, the terminal combines soft bit information on all the occasions to perform one additional decoding. Different receiver algorithms affect a blind decoding count, which in turn affects an overbooking calculation rule. To ensure same understandings between a transmitting party and a receiving party, the terminal may report a demodulation behavior and an assumed blind decoding count to a base station. Furthermore, when a PDCCH carries BWP switch indication signaling, a switch start time usually refers to a slot where the PDCCH is located. However, after PDCCH repetition is adopted, the terminal spends more time on successful PDCCH decoding, so a switch time also needs to be redesigned. In addition, in a case of receiving PDCCH carrying BWP switch indication signaling or semi-persistent PDSCH scheduling release signaling, the terminal reports, to the base station, a response of hybrid automatic repeat request-ACK (HARQ-ACK) for PDCCH decoding after N symbols following the end of the PDCCH. When PDCCH repetition is adopted, reference PDCCH candidates need to be redefined. Ultimately, PDCCH repetition may break existing scheduling rules in some scheduling scenarios. For example, establishment of some rules need to be considered for support of the scheduled PDSCH being earlier than a candidate of PDCCH repetition that is relatively late in time domain.

SUMMARY

Embodiments of this application provide a PDCCH repetition method and apparatus, and user equipment.

According to a first aspect, a PDCCH repetition method is provided and applied to UE. The method includes: in a case that UE has received information for PDCCH repetition, determining, by the UE, X PDCCH candidates of repetition, X being an integer greater than 1; and executing, by the UE, an overbooking rule based on an assumed first blind decoding count on the X PDCCH candidates, or executing, by the UE, a target operation based on a time domain resource of a target PDCCH candidate; where search spaces corresponding to the X PDCCH candidates are associated with each other, and the target PDCCH candidate is a PDCCH candidate satisfying a predetermined condition in the X PDCCH candidates.

According to a second aspect, a PDCCH repetition apparatus is provided. The PDCCH repetition apparatus includes a determining module and an execution module, where the determining module is configured to: in a case that PDCCH repetitions have been received, determine X PDCCH candidates of repetition, X being an integer greater than 1; and the execution module is configured to: execute an overbooking rule based on an assumed first blind decoding count determined by the determining module for the X PDCCH candidates; or execute a target operation based on a time domain resource of a target PDCCH candidate; where search spaces corresponding to the X PDCCH candidates are associated with each other, and the target PDCCH candidate is a PDCCH candidate satisfying a predetermined condition in the X PDCCH candidates.

According to a third aspect, a PDCCH repetition method is provided and applied to a network-side device. The method includes: transmitting, by the network-side device, X PDCCH candidates of repetition to UE; and transmitting, by the network-side device, an assumed first blind decoding count on the X PDCCH candidates to the UE.

According to a fourth aspect, a PDCCH repetition apparatus is provided. The PDDCH repetition apparatus includes a transmitting module, where the transmitting module is configured to: transmit X PDCCH candidates of repetition to UE; and transmit an assumed first blind decoding count on the X PDCCH candidates to the UE.

According to a fifth aspect, a terminal is provided. The terminal includes a processor, a memory, and a program or instructions stored in the memory and capable of running on the processor, and when the program or instructions are executed by the processor, the steps of the method according to the first aspect are implemented.

According to a sixth aspect, a terminal is provided, including a processor and a communication interface, where the processor is configured for UE to: in a case that the UE has received information for PDCCH repetition, determine X PDCCH candidates of repetition, X being an integer greater than 1; and for the UE to execute an overbooking rule based on an assumed first blind decoding count on the X PDCCH candidates, or for the UE to execute a target operation based on a time domain resource of a target PDCCH candidate; where search spaces corresponding to the X PDCCH candidates are associated with each other, and the target PDCCH candidate is a PDCCH candidate satisfying a predetermined condition in the X PDCCH candidates.

According to a seventh aspect, a network-side device is provided. The network-side device includes a processor, a memory, and a program or instructions stored in the memory and capable of running on the processor, and when the program or instructions are executed by the processor, the steps of the method according to the first aspect are implemented.

According to an eighth aspect, a network-side device is provided, including a processor and a communication interface, where the communication interface is configured to: transmit X PDCCH candidates of repetition to UE; and transmit an assumed first blind decoding count on the X PDCCH candidates to the UE.

According to a ninth aspect, a readable storage medium is provided, where the readable storage medium stores a program or instructions, and when the program or instructions are executed by a processor, the steps of the method according to the first aspect are implemented, or the steps of the method according to the third aspect are implemented.

According to a tenth aspect, a chip is provided, where the chip includes a processor and a communication interface, the communication interface is coupled to the processor, and the processor is configured to run a program or instructions so as to implement the method according to the first aspect or the method according to the third aspect.

According to an eleventh aspect, a computer program/program product is provided, where the computer program/program product is stored in a non-volatile storage medium, and the program/program product is executed by at least one processor so as to implement the steps of the PDCCH repetition method according to the first aspect.

BRIEF DESCRIPTION OF DRAWINGS

FIG. 1 is a schematic diagram of a network architecture according to an embodiment of this application;

FIG. 2 is a schematic diagram of a PDCCH repetition method according to an embodiment of this application;

DESCRIPTION OF EMBODIMENTS

Figure 3:
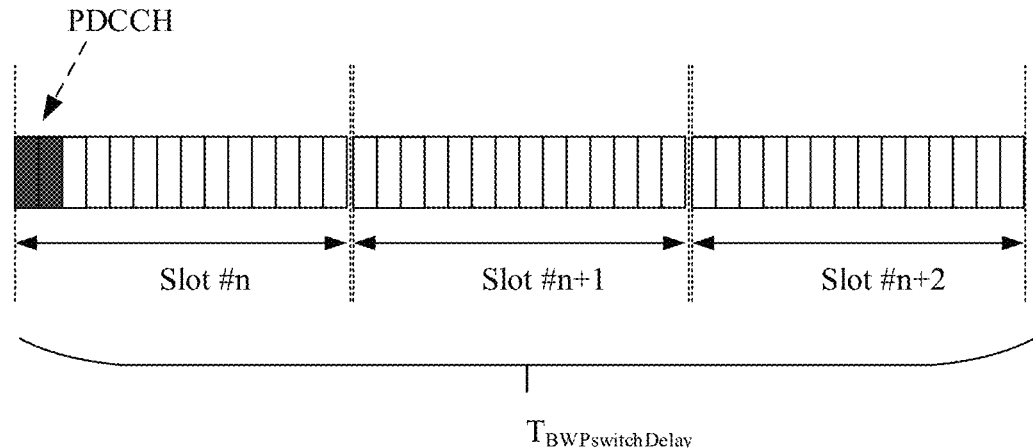
FIG. 3 is a first schematic diagram of a BWP switch procedure according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The following describes in detail the terms involved in the embodiments of this application.

1. Control Resource Set (CORESET)

In new radio (NR) systems, CORESET is introduced into downlink control signaling, and frequency domain resource locations and consecutive time domain resources that may be occupied by downlink channels (such as a physical downlink control channel (PDCCH)) are defined in one CORESET.

2. Search Space

In NR systems, search space is used for instructing user equipment (UE) to monitor PDCCH on some monitoring occasions (and some PDCCH candidates on corresponding monitoring occasions) of a time domain resource.

3. Blind Decoding (BD)

In NR systems, after a network-side device has configured PDCCH transmission for UE, the UE may not be able to determine quantities, locations, and the like of control channel elements (CCE) occupied by PDCCHs. Therefore, the UE needs to determine multiple PDCCH candidates based on at least one CORESET and at least two search spaces (one CORESET is associated with two search spaces) configured by the network-side device, and decode each PDCCH candidate to receive information carried on the PDCCH.

4. Blind Decoding Capability

Blind decoding capability information is capability information reported by UE to a network-side device, and the blind decoding capability information may include any one of the following: a maximum blind decoding count by the UE and a capability or incapability of the UE to support execution of soft bit combination.

5. Maximum Blind Decoding Count by UE

A maximum blind decoding count by UE, as a blind decoding capability of the UE, is used to indicate a capability of the UE to decode polar codes on a downlink channel (for example, PDCCH). The maximum blind decoding count may be specifically used to indicate a maximum decoding count that can be supported by the UE in one slot or one period of time (for example, a span).

6. BWP Switch Procedure

In a case that UE has received PDCCH-carried downlink control information DCI in one slot, and that the DCI carries BWP switch indication signaling, the UE can switch to a new BWP according to the BWP switch indication signaling after BWP switch delay time ($T_{BWPswitchDelay}$) slots from a transmission start time point of the one slot. The UE cannot receive or transmit any signal from the transmission start time point of the one slot to a time point at which the UE switches to the new BWP.

7. Other Terms

The terms "first", "second", and the like in the specification and claims of this application are used to distinguish between similar objects rather than to describe a specific order or sequence. It should be understood that terms used in this way are interchangeable in appropriate circumstances such that the embodiments of this application can be implemented in an order other than those illustrated or described herein. In addition, "first" and "second" are typically used to distinguish objects of a same type and do not limit quantities of the objects. For example, there may be one or more first objects. In addition, in this specification and claims, "and/or" indicates at least one of the connected objects, and the character "/" generally indicates an "or" relationship between the contextually associated objects.

The following describes a communication system related to a transmission method according to the embodiments of this application.

It should be noted that technologies described in the embodiments of this application are not limited to a long term evolution (LTE) or LTE-Advanced (LTE-A) system, and may also be applied to other wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for illustration purposes, and NR terms are used in most of the following descriptions, although these technologies may also be applied to other applications than the NR system application, for example, the 6th generation (6G) communication system.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that the terminal 11 is not limited to any particular type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission reception point (TRP), or other appropriate terms in the art. Provided that the same technical effects are achieved, the base station is not limited to any specific technical term. It should be noted that only the base station in the NR system is used as an example in the embodiments of this application, although a specific type of the base station is not limited.

The following describes in detail a PDCCH repetition method provided in the embodiments of this application by using some embodiments and application scenarios thereof with reference to the accompanying drawings.

FIG. 2 is a schematic diagram of a PDCCH repetition method according to an embodiment of this application. As shown in FIG. 2, the PDCCH repetition method provided in this embodiment of this application may include the following step 101 and step 102 (or step 103).

Step 101: In a case that a PDCCH repetition apparatus has received information for PDCCH repetition, the PDCCH repetition apparatus determines X PDCCH candidates of repetition.

In this embodiment of this application, X is an integer greater than 1.

Optionally, in this embodiment of this application, the PDCCH repetition apparatus can receive higher-layer signaling from a network-side device, where the higher-layer signaling includes radio resource control (RRC) signaling, and the RRC signaling includes at least two search spaces and a CORESET that are configured by the network-side device for the PDCCH repetition apparatus, so that the PDCCH repetition apparatus can determine the X PDCCH candidates of repetition based on the CORESET and at least one of the search spaces.

Optionally, in this embodiment of this application, the CORESET corresponds to at least one transmission reception point (TRP).

In this embodiment of this application, search spaces corresponding to the X PDCCH candidates are associated with each other.

Optionally, in this embodiment of this application, each search space in the at least two search spaces associated with the CORESET may correspond to one PDCCH candidate.

Optionally, in this embodiment of this application, M search space association groups are transmitted in one same transmission unit, where each search space association group includes X search spaces, and the X search spaces are in one-to-one correspondence to the X PDCCH candidates.

Each search space association group includes K PDCCH candidate sets, and each PDCCH candidate set includes X PDCCH candidates.

A total quantity of PDCCH candidate sets transmitted in one transmission unit is H.

A value of M is determined by any one of the following: a preset value and a value determined by the network-side device based on a capability reported by the PDCCH repetition apparatus. A value of K is determined by any one of the following: a preset value and a value determined by the network-side device based on the capability reported by the PDCCH repetition apparatus. A value of H is determined by any one of the following: a preset value and a value determined by the network-side device based on the capability reported by the PDCCH repetition apparatus.

Further optionally, in this embodiment of this application, the transmission unit may include any one of the following: a time domain transmission symbol (orthogonal frequency division multiplexing (OFDM) symbol), a slot, a mini-slot, a sub-frame, a radio frame, and the like.

Optionally, in this embodiment of this application, the PDCCH repetition apparatus can determine the X PDCCH candidates based on the CORESET and the at least two search spaces.

It should be noted that for the description that the PDCCH repetition apparatus determines the PDCCH based on the CORESET and the search spaces, reference may be made to specific descriptions in the related art. Details are not described in this embodiment of this application.

Step 102: The PDCCH repetition apparatus executes an overbooking rule based on an assumed first blind decoding count on the X PDCCH candidates.

It can be understood that the PDCCH repetition apparatus executing an overbooking rule based on an assumed first blind decoding count on the X PDCCH candidates may also be considered as the PDCCH repetition apparatus determining a blind decoding count for PDCCH repetition according to the overbooking rule.

Step 103: The PDCCH repetition apparatus executes a target operation based on a time domain resource of a target PDCCH candidate.

In this embodiment of this application, the target PDCCH candidate is a PDCCH candidate satisfying a predetermined condition in the X PDCCH candidates.

Optionally, in this embodiment of this application, the predetermined condition may include at least one of the following:

the last PDCCH candidate in terms of time domain resource;

the 1st PDCCH candidate in terms of time domain resource;

a PDCCH candidate associated with a search space with a largest index value;

a PDCCH candidate associated with a search space with a smallest index value;

a PDCCH candidate associated with a control resource set with a largest index value; and a PDCCH candidate associated with a control resource set with a smallest index value.

Optionally, in this embodiment of this application, the target operation may include any one of the following: BWP switch, transmission of acknowledgment information, and determining of scheduling patterns for other transmissions.

In the PDCCH repetition method according to this embodiment of this application, in the case that the PDCCH repetition apparatus has received information for PDCCH repetition, the PDCCH repetition apparatus can determine the X PDCCH candidates, where the search spaces corresponding to the X PDCCH candidates are associated with each other; the PDCCH repetition executes the overbooking rule based on the assumed first blind decoding count on the X PDCCH candidates; or the PDCCH repetition apparatus executes the target operation based on the time domain resource of the target PDCCH candidate. Because the PDCCH repetition apparatus can execute the overbooking rule based on the assumed first blind decoding count on the X PDCCH candidates to avoid a case in which the blind decoding count on the X PDCCH candidates exceeds the maximum blind decoding count of the PDCCH repetition apparatus, the blind decoding reliability of the PDCCH repetition apparatus can be improved; or because the PDCCH repetition apparatus can execute the target operation based on the time domain resource of the PDCCH candidate satisfying the predetermined condition in the X PDCCH candidates to avoid a case in which the PDCCH repetition apparatus is unable to determine to execute the target operation after a delay time from which time point, the operation execution reliability can be improved. In this way, the operation execution reliability of the PDCCH repetition apparatus can be improved.

Optionally, in this embodiment of this application, the first blind decoding count is determined based on any one of the following:

a default assumed blind decoding count for demodulating PDCCH repetition;

a blind decoding count reported by the PDCCH repetition apparatus for demodulating PDC CH repetition; and a blind decoding count determined by the network-side device based on the blind decoding count reported by the PDCCH repetition apparatus for demodulating PDCCH repetition.

Further optionally, in this embodiment of this application, in a case that the first blind decoding count is determined based on the blind decoding count determined by the network-side device based on the blind decoding count reported by the PDCCH repetition apparatus for demodulating PDCCH repetition, the PDDCH repetition apparatus can report the blind decoding count for decoding PDCCH repetition to the network-side device. In this way, the network-side device can determine a new blind decoding count, so that the PDCCH repetition apparatus can execute the overbooking rule based on the new blind decoding count.

It can be understood that when the PDCCH repetition apparatus is configured with a PDCCH repetition, the PDCCH repetition is transmitted using at least two PDCCH candidates. The overbooking rule is executed based on a default assumed PDCCH repetition decoding capability or a PDCCH repetition decoding capability reported by the PDCCH repetition apparatus.

The default assumed blind decoding BD count may be 2 or 3. The PDCCH repetition apparatus reports the PDCCH repetition decoding capability (the capability includes the BD count and/or is a capability of executing soft bit combination).

Even when the PDCCH repetition apparatus reports one blind decoding count, the network-side device can instruct, by using signaling, the PDCCH repetition apparatus to execute the overbooking rule based on another assumed blind count, where the another blind count is less than or equal to the one blind decoding count.

The following describes, with examples, how the PDCCH repetition apparatus executes the overbooking rule based on the assumed first blind decoding count on the X PDCCH candidates.

Optionally, in this embodiment of this application, step 102 may be specifically implemented in the following step 102*a*.

Step 102*a*: The PDCCH repetition apparatus executes the overbooking rule based on the first blind decoding count and according to a predetermined rule.

Optionally, in a possible implementation of this embodiment of this application, the predetermined rule includes any one of the following:

each PDCCH candidate in the X PDCCH candidates is associated with a different search space; and for a PDCCH candidate associated with a search space with a small index value, counting is based on a third blind decoding count, and for a PDCCH candidate associated with a search space with a large index value, counting is based on a fourth blind decoding count, where the fourth blind decoding count is greater than or equal to the third blind decoding count.

Further optionally, in this embodiment of this application, the foregoing index value may specifically be an ID value.

For example, in a case that three BDs are assumed for PDCCH repetitions, when a quantity of PDCCH repetitions is 2 and each PDCCH candidate is associated with a different search space, for a PDCCH candidate associated with a small search space ID, counting is based on one BD, and for a PDCCH candidate associated with a large search space ID, counting is based on two BDs.

Optionally, in this embodiment of this application, in a case that all PDCCH candidates in the X PDCCH candidates are transmitted in one same transmission unit and the X PDCCH candidates do not completely overlap in terms of time domain resource, the last symbol of a PDCCH candidate associated with a search space with a larger index value is later than the last symbol of a PDCCH candidate associated with a search space with a smaller index value; or the 1st symbol of a PDCCH candidate associated with a search space with a larger index value is later than the 1st symbol of a PDCCH candidate associated with a search space with a smaller index value.

For example, when the PDCCH repetitions are transmitted in one same transmission unit (for example, a slot) and two PDCCH candidates do not completely overlap in time domain, the last symbol of a PDCCH candidate associated with a larger search space ID is later than the last symbol of a PDCCH candidate associated with a smaller search space ID; or the 1st symbol of a PDCCH candidate associated with a larger search space ID is later than the 1st symbol of a PDCCH candidate associated with a smaller search space ID.

Optionally, in another possible implementation of this embodiment of this application, the predetermined rule includes any one of the following:

in a case that the first blind decoding count is equal to X, one blind decoding is counted for each PDCCH candidate, and if the X-th blind decoding exceeds a blind decoding capability reported by the PDCCH repetition apparatus, X–1 blind decodings are counted for the PDCCH repetitions; and in a case that the first blind decoding count is equal to X, one blind decoding is counted for each PDCCH candidate, and if the X-th blind decoding does not exceed the blind decoding capability reported by the PDCCH repetition apparatus, X blind decodings are counted for the PDCCH repetitions; where the X-th blind decoding involves combining soft bit information corresponding to the X PDCCH candidates and performing blind decoding on the combined soft bit information, and the blind decoding performed on the combined soft bit information is associated with a first search space, the first search space is a predetermined specific search space or a specific search space configured by the network-side device, and the first search space is used for blind decoding on the combined soft bit information.

For example, when the overbooking rule is counted based on assumed three BDs for the PDCCH repetitions, one BD is counted for each PDCCH candidate. If the third BD does not exceed the blind decoding capability reported by the PDCCH repetition apparatus, three blind decodings are counted for the PDCCH repetitions, where the third blind decoding involves combining soft bit information corresponding to the X PDCCH candidates and performing blind decoding on the combined soft bit information.

The first search space may be a virtual search space not indicated by using higher-layer signaling. This first search space has the lowest priority assumed in the overbooking rule. The blind decoding capability of CCE is not calculated on the first search space.

Optionally, in this embodiment of this application, step 102 may be specifically implemented in the following step 102b.

Step 102b: In a case that any one of the X PDCCH candidates satisfies a first condition, the PDCCH repetition apparatus determines the X PDCCH candidates as a repetition transmission, and executes the overbooking rule based on the assumed first blind decoding count on the X PDCCH candidates.

In this embodiment of this application, the first condition is that a time-frequency resource of any one of the PDCCH candidates overlaps a target time-frequency resource.

Optionally, in this embodiment of this application, the target time-frequency resource includes any one of the following: time-frequency resource for synchronization signal block SSB, time-frequency resource for cell-specific reference signal CRS configured via higher layer, time-frequency resource on which rate matching is implemented for other physical downlink shared channels PDSCHs, and unusable time-frequency resource configured via higher layer.

It can be understood that the PDCCH repetition apparatus still assumes that a transmission behavior for PDCCHs is a repetition transmission, and the overbooking rule of the PDCCH repetition apparatus is not affected by time-frequency resource conflicts.

Optionally, in this embodiment of this application, after step 102, the PDCCH repetition method provided in this embodiment of this application further includes the following step 201.

Step 201: In a case that a second condition is satisfied, the PDCCH repetition apparatus monitors the X PDCCH candidates and Y PDCCH candidates.

The second condition includes: the PDCCH repetition apparatus has reported a target capability, the Y PDCCH candidates are not used for PDCCH repetition, the Y PDCCH candidates are associated with different receive beams, and time domain resources of the Y PDCCHs overlap, where the target capability is a capability of the PDCCH repetition apparatus to simultaneously receive PDCCH candidates associated with different beams.

It can be understood that if the PDCCH repetition apparatus reports the capability of receiving PDCCH repetitions simultaneously, multiple Y PDCCH candidates that are not used for PDCCH repetition are also configured by the network-side device, the Y PDCCH candidates are associated with different QCL-typeDs, and the time domain resources of the Y PDCCHs overlap, the PDCCH repetition apparatus can monitor the X PDCCH candidates and the Y PDCCH candidates simultaneously.

The following describes, with examples, how the PDCCH repetition apparatus executes a BWP switch procedure based on the time domain resource of the target PDCCH candidate.

The PDCCH repetition apparatus can receive a PDCCH from the network-side device. As shown in FIG. 3, if the PDCCH carries BWP switch indication signaling, in an existing NR communication system, the PDCCH candidate can be transmitted within only the first 3 symbols of the time domain resource of one transmission unit (corresponding to one slot), so that the PDCCH repetition apparatus can execute the BWP switch procedure after a delay time $(T_{BWPswitchDelay})$ from a transmission start time, point of one transmission unit. However, in a case that PDCCH repetitions are configured by the network-side device for the PDCCH repetition apparatus, multiple PDCCH candidates may not always be transmitted within the first 3 symbols of the time domain resource of one transmission unit, where one transmission unit here corresponds to one slot in terms of concept in the NR communication system. A terminal can combine multiple PDCCH candidates to correctly decode DCI information by performing soft bit combination on the last PDCCH candidate in the slot, which prolongs the time for decoding the DCI compared to the existing design. To ensure that the terminal accurately executes BWP switch (mainly adjustment performed by the PDCCH repetition apparatus on (RF) radio frequency) in a specified time, a preset time needs to be added on the basis of the parameter $T_{BWPswitchDelay}$.

In this embodiment of this application, in the case that PDCCH repetitions have been configured by the network-side device for the PDCCH repetition apparatus, the PDCCH repetition apparatus can execute the BWP switch procedure according to the BWP switch indication signaling and a time domain resource of a PDCCH candidate. To be specific, the PDCCH repetition apparatus can determine to execute the BWP switch procedure after a delay time from a transmission start time point of a transmission unit in which a PDCCH candidate is located, to solve the problems present in the related art.

Optionally, in this embodiment of this application, before step 103, the PDCCH repetition method provided in this embodiment of this application may further include the following step 301, and step 103 may be specifically implemented in the following step 103*a*.

Step 301: The PDCCH repetition apparatus obtains BWP switch indication signaling.

Further optionally, in this embodiment of this application, the PDCCH repetition apparatus can perform blind decoding on the X PDCCH candidates to obtain the BWP switch indication signaling.

Step 103*a*: The PDCCH repetition apparatus executes a BWP switch procedure according to the BWP switch indication signaling and the time domain resource of the target PDCCH candidate.

In this embodiment of this application, the target PDCCH candidate is the last PDCCH candidate in terms of time domain resource in the X PDCCH candidates.

Further optionally, in this embodiment of this application, the PDCCH repetition apparatus can obtain a delay time (for example, a preset switch delay time in the following embodiments) configured by the network-side device according to the BWP switch indication signaling, and execute the BWP switch procedure based on the delay time and the time domain resource in the target PDCCH candidate.

The following describes, with four different examples, how the PDCCH repetition apparatus executes the BWP switch procedure based on the delay time and the time domain resource of the target PDCCH candidate.

Optionally, in a possible implementation of this application, step 103 may be specifically implemented in the following step 103*a*1.

Step 103*a*1: The PDCCH repetition apparatus executes the BWP switch procedure according to the BWP switch indication signaling and the time domain resource of the target PDCCH candidate after a first time length from a transmission start time point of a transmission unit where the target PDCCH candidate is located.

In this embodiment of this application, the first time length includes a preset switch delay time and a preset time length.

It can be understood that the first time length is a sum of the preset switch delay time and the preset time length.

Further optionally, in this embodiment of this application, the preset switch delay time ($T_{BWPswitchDelay}$) may specifically be a delay time prescribed by a communication protocol.

Specifically, in this embodiment of this application, the preset switch delay time may be different when the BWP switch procedure occurs on different cells.

For example, if the BWP switch procedure occurs on a secondary cell (scell), the preset switch delay time may be a prescribed time in a secondary cell dormancy (scell domancy) scenario.

Further optionally, in this embodiment of this application, the preset time length may include Z slots, where Z is a positive integer.

Specifically, in this embodiment of this application, the preset time length may specifically include 1 slot.

In this embodiment of this application, because some time is required for the terminal to demodulate PDCCH repetitions, for example, combining of soft bits leads to increased time for decoding PDCCHs, the PDCCH repetition apparatus can complete BWP switch after delay of $T_{BWPswitchDe-lay}+Z$ slots from a start time of a slot where the target PDCCH candidate (that is, the last PDCCH candidate in terms of time domain resource) is located. Multiple PDCCH candidates of repetition may fall within one same slot or occupy different slots.

Optionally, in another possible implementation of this application, step 103*a* may be specifically implemented in the following step 103*a*2.

Step 103*a*2: In a case that the X PDCCH candidates satisfy a third condition and a time domain resource occupied by the target PDCCH candidate in one transmission unit exceeds a first threshold, the PDCCH repetition apparatus executes the BWP switch procedure according to the BWP switch indication signaling and the time domain resource of the target PDCCH candidate after a first time length from a transmission start time point of a first transmission unit.

In this embodiment of this application, the first transmission unit is a transmission unit in which a second PDCCH candidate is located; and the second PDCCH candidate is the 1st PDCCH candidate in terms of time domain resource in the X PDCCH candidates.

Optionally, in this embodiment of this application, the third condition is that the X PDCCH candidates are transmitted in one same transmission unit.

Further optionally, in this embodiment of this application, the time domain resource occupied by the target PDCCH candidate in one transmission unit may specifically be symbol.

Further optionally, in this embodiment of this application, the first threshold may specifically be a threshold prescribed by a communication protocol.

Specifically, in this embodiment of this application, the first threshold may specifically be 3.

It can be understood that in the case that the X PDCCH candidates are transmitted in one same transmission unit (that is, when intra-slot repetitions are configured by the network-side device) and the target PDCCH candidate occupies more than 3 symbols in one transmission unit, the PDCCH repetition apparatus can execute the BWP switch procedure after the first time length from the transmission start time point of the first transmission unit.

Further optionally, in this embodiment of this application, "the target PDCCH candidate occupies more than 3 symbols in one transmission unit" described above may be understood as that the 1st symbol (or last symbol) of the target PDCCH candidate in terms of time domain resource exceeds the 3rd symbol of a transmission unit in which the target PDCCH candidate is located.

Figure 4:
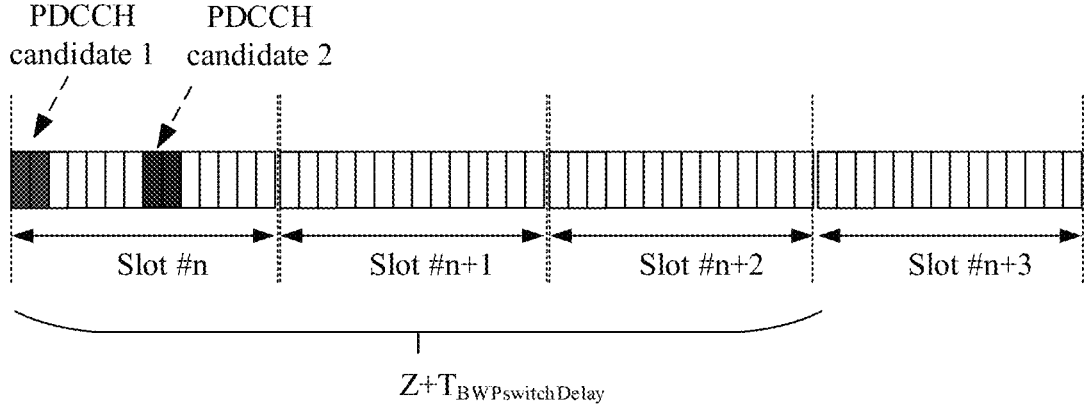
FIG. 4 is a second schematic diagram of a BWP switch procedure according to an embodiment of this application.

For example, as shown in FIG. 4, in a case that intra-slot repetitions are configured by the network-side device and the X PDCCH candidates (for example, PDCCH candidate 1 and PDCCH candidate 2) are transmitted in one same transmission unit (for example, slot #1), if PDCCH candidate 2 occupies more than 3 symbols in slot #1, the PDCCH repetition apparatus can execute the BWP switch procedure after the first time length from the transmission start time point of the first transmission unit (that is, slot #1).

In this embodiment of this application, in the case that the X PDCCH candidates satisfy the third condition and the time domain resource occupied by the target PDCCH candidate in one transmission unit exceeds the first threshold, because it is possible that no PDCCH is blindly decoded on the 1st PDCCH candidate in terms of time domain resource in the X PDCCH candidates, the PDCCH repetition apparatus can execute the BWP switch procedure after a first time length from a transmission start time point of a first transmission unit in which the 1st PDCCH candidate is located, that is, after a time length of the sum of the preset switch delay time and the preset time length.

Optionally, in still another possible implementation of this application, step 103a may be specifically implemented in the following step 103a3.

Step 103a3: In a case that the X PDCCH candidates satisfy the third condition and a time offset between a first time point of the target PDCCH candidate and a first point of the second PDCCH candidate is greater than a second threshold, the PDCCH repetition apparatus executes the BWP switch procedure according to the BWP switch indication signaling and the time domain resource of the target PDCCH candidate after the first time length from the transmission start time point of the first transmission unit.

In this embodiment of this application, the first time point includes any one of the following: a transmission start time point and a transmission end time point.

It can be understood that in the case that the X PDCCH candidates are transmitted in one same transmission unit (that is, when intra-slot repetitions are configured by the network-side device) and a time offset between a transmission start time point (or transmission end time point) of the target PDCCH candidate and a transmission start time point (or transmission end time point) of the second PDCCH candidate is greater than the second threshold, the PDCCH repetition apparatus can execute the BWP switch procedure after the first time length from the transmission start time point of the first transmission unit.

In this embodiment of this application, the second threshold is a threshold reported by the PDCCH repetition apparatus to the network-side device.

Further optionally, in this embodiment of this application, in a case that the X PDCCH candidates satisfy the third condition and the time offset between the first time point of the target PDCCH candidate and the first time point of the second PDCCH candidate is less than or equal to the second threshold, the PDCCH repetition apparatus can execute the BWP switch procedure after a preset switch delay time (that is, a second time length in the following embodiments) from the transmission start time point of the first transmission unit.

In this embodiment of this application, in the case that the X PDCCH candidates satisfy the third condition and the time offset between the first time point of the target PDCCH candidate and the first time point of the second PDCCH candidate is greater than the second threshold, because it is possible that no PDCCH is blindly decoded on the 1st PDCCH candidate in terms of time domain resource in the X PDCCH candidates, the PDCCH repetition apparatus can execute the BWP switch procedure after a first time length from a transmission start time point of a first transmission unit in which the second PDCCH candidate is located, that is, after a time length of the sum of the preset switch delay time and the preset time length.

Optionally, in yet another possible implementation of this application, step 103a may be specifically implemented in the following step 103a4.

Step 103a4: In a case that the X PDCCH candidates satisfy a fourth condition, the PDCCH repetition apparatus executes the BWP switch procedure according to the BWP switch indication signaling and the time domain resource of the target PDCCH candidate after a second time length from a transmission start time point of a second transmission unit or after a first time length from a transmission start time point of a first transmission unit.

Optionally, in this embodiment of this application, the fourth condition is that the X PDCCH candidates are transmitted in different transmission units.

Optionally, in this embodiment of this application, the second transmission unit is a transmission unit in which the target PDCCH candidate is located.

Optionally, in this embodiment of this application, the second time length is a preset switch delay time.

It can be understood that in the case that the X PDCCH candidates are transmitted in different transmission units (that is, when intra-slot repetitions are configured by the network-side device), the PDCCH repetition apparatus can execute the BWP switch procedure after the preset switch delay time from the transmission start time point of the second transmission unit.

In this embodiment of this application, in the case that the X PDCCH candidates satisfy the fourth condition, because it is possible that no PDCCH is blindly decoded on the 1st PDCCH candidate in terms of time domain resource in the X PDCCH candidates, the PDCCH repetition apparatus can execute the BWP switch procedure after the second time length from the transmission start time point of the second transmission unit, that is, after the preset switch delay time; or the PDCCH repetition apparatus can execute the BWP switch procedure after the first time length from the transmission start time point of the first transmission unit, that is, after a time length of the sum of the preset switch delay time and the preset time length.

In this way, it can be seen that the PDCCH repetition apparatus can execute the BWP switch procedure according to the BWP switch indication signaling and a time domain resource of a PDCCH candidate. To be specific, the PDCCH repetition apparatus can determine to execute the BWP switch procedure after a delay time from a transmission start time point of a transmission unit in which a PDCCH candidate is located. Therefore, the reliability of executing the BWP switch procedure by the PDCCH repetition apparatus can be improved.

The following describes, with examples, how the PDCCH repetition apparatus transmits acknowledgment information to the network-side device based on the time domain resource of the target PDCCH candidate.

In the related art, in a case that the PDCCH repetition apparatus has successfully decoded or has not decoded PDCCH candidates, the PDCCH repetition apparatus can transmit ACK/NACK information to the network-side device, so that the network-side device can execute related operations based on the ACK/NACK information. However, it is not prescribed in the related art that in a case that PDCCH repetitions are configured by the network-side device for the PDCCH repetition apparatus, how the PDCCH repetition apparatus transmits ACK/NACK to the network-side device.

However, in this embodiment of this application, in the case that PDCCH repetitions are configured by the network-side device for the PDCCH repetition apparatus, the PDCCH repetition apparatus can transmit the acknowledgment information to the network-side device based on first signaling and a time domain resource of a PDCCH candidate, so as to solve the above problem in the related art.

Optionally, in this embodiment of this application, before step 103, the PDCCH repetition method provided in this embodiment of this application may further include the following step 401, and step 103 may be specifically implemented in the following step 103*b*.

Step 401: The PDCCH repetition apparatus obtains first signaling.

It should be noted that for the description of the PDCCH repetition apparatus obtaining the first signaling, reference may be made to specific descriptions of the PDCCH repetition apparatus obtaining the BWP switch indication signaling in the foregoing embodiments. Details are not described in this embodiment of this application.

In this embodiment of this application, the first signaling includes any one of the following: secondary cell dormancy indication signaling and semi-persistent PDSCH scheduling release indication signaling.

Step 103*b*: The PDCCH repetition apparatus transmits acknowledgment information to the network-side device based on the first signaling and the time domain resource of the target PDCCH candidate.

In this embodiment of this application, the target PDCCH candidate is the last PDCCH candidate in terms of time domain resource in the X PDCCH candidates.

Optionally, in this embodiment of this application, step 103*b* may be specifically implemented in the following step 103*b*1.

Step 103*b*1: The PDCCH repetition apparatus transmits acknowledgment information to the network-side device based on the first signaling and the time domain resource of the target PDCCH candidate after Q symbols from an end symbol of the target PDCCH candidate in terms of time domain resource.

In this embodiment of this application, Q is a positive integer.

In this embodiment of this application, the target PDCCH candidate is the last PDCCH candidate in terms of time domain resource in the X PDCCH candidates.

It can be understood that a start location of the 1st symbol in the Q symbols in terms of time domain resource is calculated from the end of the last symbol of the target PDCCH candidate in terms of time domain resource.

Figure 5:
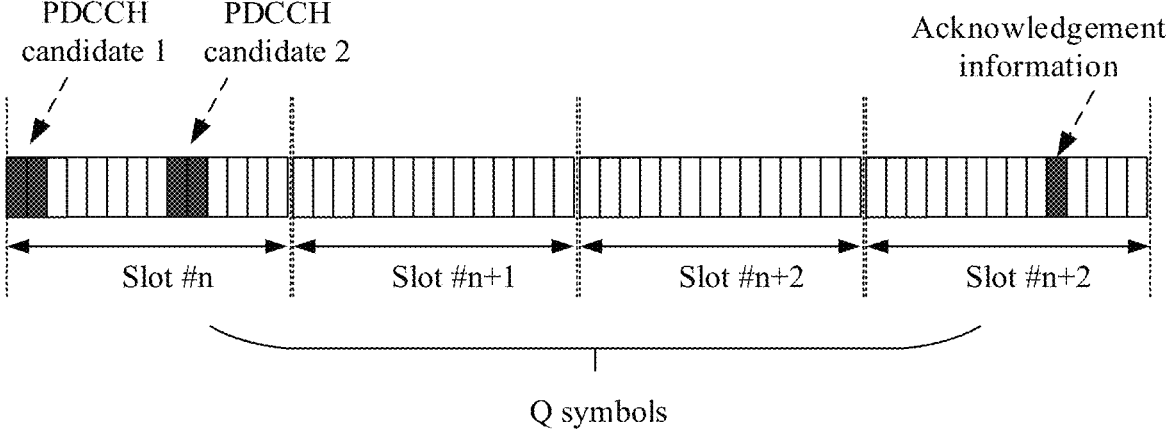
FIG. 5 is a schematic diagram of transmitting acknowledgment information according to an embodiment of this application.

For example, as shown in FIG. 5, the X PDCCH candidates include PDCCH candidate 1 and PDCCH candidate 2, where PDCCH candidate 2 is the last PDCCH candidate in terms of time domain resource in PDCCH candidate 1 and PDCCH candidate 2. The PDCCH repetition apparatus can transmit the acknowledgment information to the network-side device based on the first signaling and a time domain resource of the PDCCH candidate 2 after Q symbols from an end symbol (for example, symbol 10) of the PDCCH candidate 2 in terms of time domain resource.

Further optionally, in this embodiment of this application, the acknowledgment information may specifically be ACK/NACK information. The ACK/NACK information is used to indicate whether the PDCCH repetition apparatus has successfully decoded PDCCH candidates.

In this way, it can be seen that the PDCCH repetition apparatus can transmit the acknowledgment information to the network-side device based on the first signaling and a time domain resource of a PDCCH candidate. To be specific, the PDCCH repetition apparatus can determine to transmit the acknowledgment information to the network-side device after at least one symbol from a symbol of this PDCCH candidate in terms of time domain resource. Therefore, the reliability of transmitting the acknowledgment information by the PDCCH repetition apparatus can be improved.

The following describes, with examples, how the PDCCH repetition apparatus determines a PDSCH scheduling pattern based on the time domain resource of the target PDCCH candidate.

Optionally, in this embodiment of this application, before step 103, the PDCCH repetition method provided in this embodiment of this application may further include the following step 501, and step 103 may be specifically implemented in the following step 103*c*.

Step 501: The PDCCH repetition apparatus obtains PDSCH scheduling signaling.

It should be noted that for the description of the PDCCH repetition apparatus obtaining the PDSCH scheduling signaling, reference may be made to specific descriptions of the PDCCH repetition apparatus obtaining the BWP switch indication signaling in the foregoing embodiment. Details are not described in this embodiment of this application.

Step 103*c*: The PDCCH repetition apparatus determines the PDSCH scheduling pattern based on the PDSCH scheduling signaling and the time domain resource of the target PDCCH candidate.

In this embodiment of this application, a start symbol of the target PDCCH candidate in terms of time domain resource and a start symbol of the PDSCH in terms of time domain resource are transmitted in one same transmission unit.

In this embodiment of this application, the target PDCCH candidate includes any one of the following:

the 1st PDCCH candidate or last PDCCH candidate in terms of time domain resource in the X PDCCH candidates;

a PDCCH candidate associated with a search space with a largest index value or PDCCH candidate associated with a search space with a smallest index value in the X PDCCH candidates; and a PDCCH candidate associated with a control resource set with a largest index value or PDCCH candidate associated with a control resource set with a smallest index value in the X PDCCH candidates.

It can be understood that the PDCCH repetition apparatus can define a reference PDCCH candidate (that is, the target PDCCH candidate) from the X PDCCH candidates, and determine the PDSCH scheduling pattern based on the PDSCH scheduling signaling and a time domain resource of the reference PDCCH candidate.

Optionally, in this embodiment of this application, in a case that the PDSCH employs a first mapping scheme, symbols of the target PDCCH candidate in terms of time domain resource are located in the first R symbols of one same transmission unit, R being a positive integer.

Further optionally, in this embodiment of this application, the first mapping scheme may specifically be a mapping scheme of type A.

Further optionally, in this embodiment of this application, a value of R may specifically be 3.

Optionally, in this embodiment of this application, in a case that the PDSCH employs a second mapping scheme, the start symbol of the target PDCCH candidate in terms of time domain resource is not later than the start symbol of the PDSCH in terms of time domain resource.

Further optionally, in this embodiment of this application, the second mapping scheme may specifically be a mapping scheme of type B.

Optionally, in this embodiment of this application, in a case that the target PDCCH candidate is the last PDCCH candidate in terms of time domain resource in the X PDCCH candidates, the PDSCH scheduling pattern is determined based on a first parameter value.

Optionally, in this embodiment of this application, the first parameter value is specifically used to characterize any one of the following:

the start symbol of the PDSCH in terms of time domain resource is advanced by T symbols or delayed by T symbols relative to a location of the start symbol of the target PDCCH candidate in terms of time domain resource, T being a positive integer; and a location of a scheduling start symbol of the PDSCH relative to a target symbol; where a gap between the target symbol and the 1st symbol or last symbol of any one of the X PDCCH candidates in terms of time domain resource is a target value; and the target value is determined by any one of the following:

a preset value and a value determined by the network-side device based on a capability reported by the PDCCH repetition apparatus.

Further optionally, in this embodiment of this application, the first parameter value may specifically be an SLIV (startSymbolAndLength) value.

It can be understood that DCI carries a TDRA (Time domain resource assignment) table indicating the scheduling pattern of the PDSCH with respect to the PDCCH (including a slot offset, a location of a start symbol of the PDSCH, and a symbol length of the PDSCH). TDRA is represented by N bits (bit).

Patterns represented by different bits are configured through higher-layer signaling.

Two examples are described below for illustrative purposes.

Example 1: A parameter is configured by the network-side device through higher-layer signaling, denoted by 1 bit, and used for distinguishing start symbol information carried in SLIV to indicate that the PDSCH is advanced or delayed by T symbols relative to the PDCCH.

For example, bit=0 indicates delay; and bit=1 indicates advance.

In this embodiment of this application, bit may be equal to 1, that is, the PDSCH may be advanced relative to the PDCCH.

Figure 6:
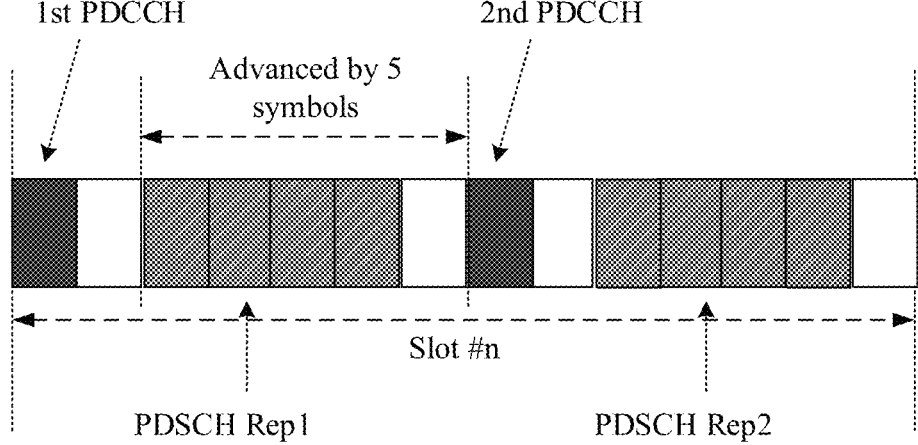
FIG. 6 is a first schematic diagram of a first parameter value according to an embodiment of this application.

For example, as shown in FIG. 6, the PDSCH start symbol is advanced by 5 symbols relative to the start symbol of the 2nd PDCCH.

Example 2: A capability is reported by the PDCCH repetition apparatus and used to indicate a largest gap between a PDSCH scheduling start symbol and a start symbol of the 1st PDCCH candidate or the 2nd candidate in any PDCCH candidate.

Figure 7:
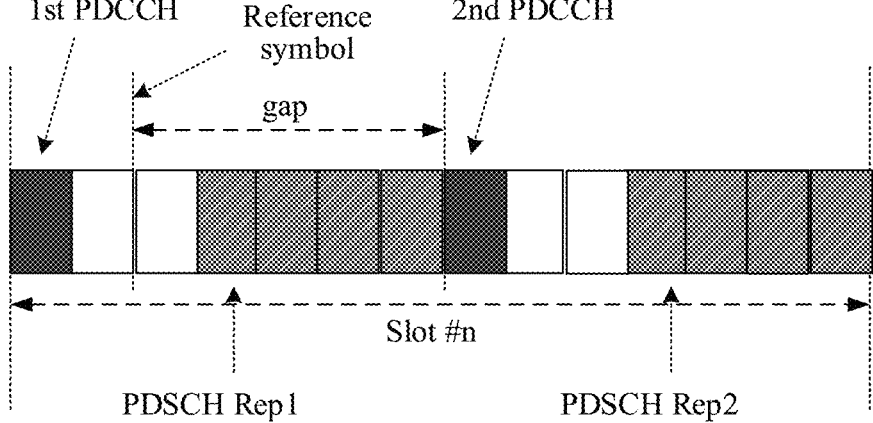
FIG. 7 is a second schematic diagram of a first parameter value according to an embodiment of this application.

For example, as shown in FIG. 7, the PDSCH start symbol is delayed by one symbol relative to the target symbol. A target value of the gap between the target symbol and the start symbol of the 2nd PDCCH candidate is equal to 5 symbols. The value of the gap may be predefined, or reference may be mad to a capability reported by a terminal.

It should be noted that the PDCCH repetition method provided in this embodiment of this application may be executed by a PDCCH repetition apparatus, or a control module for executing the PDCCH repetition method in the PDCCH repetition apparatus. In this embodiment of this application, an example in which the PDCCH repetition method is executed by the PDCCH repetition apparatus is used for describing this embodiment of this application.

It should be noted that a network-side device embodiment corresponds to a terminal-side embodiment. All the implementations of the terminal-side embodiment are applicable to the network-side device embodiment, with the same technical effects achieved. Details are not described herein again.

Figure 8:
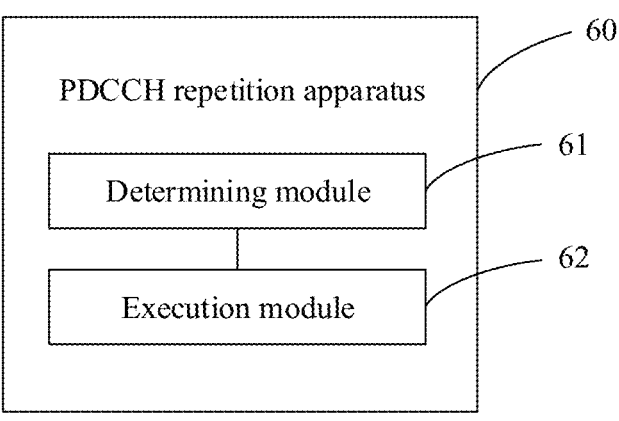
FIG. 8 is a first schematic diagram of a PDCCH repetition apparatus according to an embodiment of this application.

FIG. 8 is a possible schematic structural diagram of a PDCCH repetition apparatus involved in an embodiment of this application, where the PDCCH repetition apparatus is UE. As shown in FIG. 8, the PDCCH repetition apparatus 60 may include a determining module 61 and an execution module 62.

The determining module 61 is configured to: in a case that PDCCH repetitions have been received, determine X PDCCH candidates of repetition, X being an integer greater than 1. The execution module 62 is configured to: execute an overbooking rule based on an assumed first blind decoding count determined by the determining module 61 for the X PDCCH candidates; or execute a target operation based on a time domain resource of a target PDCCH candidate. Search spaces corresponding to the X PDCCH candidates are associated with each other, and the target PDCCH candidate is a PDCCH candidate satisfying a predetermined condition in the X PDCCH candidates.

In a possible implementation, the first blind decoding count is determined based on any one of the following: a default assumed blind decoding count for demodulating PDCCH repetition; a blind decoding count reported by the PDCCH repetition apparatus for demodulating PDCCH repetition; and a blind decoding count determined by a network-side device based on the blind decoding count reported by the PDCCH repetition apparatus for demodulating PDCCH repetition.

In a possible implementation, the execution module 62 is specifically configured for the PDCCH repetition apparatus to execute the overbooking rule based on the first blind decoding count and according to a predetermined rule.

In a possible implementation, the predetermined rule includes any one of the following: each PDCCH candidate in the X PDCCH candidates is associated with a different search space; and for a PDCCH candidate associated with a search space with a small index value, counting is based on a third blind decoding count, and for a PDCCH candidate associated with a search space with a large index value, counting is based on a fourth blind decoding count, where the fourth blind decoding count is greater than or equal to the third blind decoding count.

In a possible implementation, in a case that all PDCCH candidates in the X PDCCH candidates are transmitted in one same transmission unit and the X PDCCH candidates do not completely overlap in terms of time domain resource, the last symbol of a PDCCH candidate associated with a search space with a larger index value is later than the last symbol of a PDCCH candidate associated with a search space with a smaller index value; or the 1st symbol of a PDCCH candidate associated with a search space with a larger index value is later than the 1st symbol of a PDCCH candidate associated with a search space with a smaller index value.

In a possible implementation, the predetermined rule includes any one of the following: in a case that the first blind decoding count is equal to X, one blind decoding is counted for each PDCCH candidate, and if the X-th blind decoding exceeds a blind decoding capability reported by the PDCCH repetition apparatus, X−1 blind decodings are counted for the PDCCH repetitions; and in a case that the first blind decoding count is equal to X, one blind decoding is counted for each PDCCH candidate, and if the X-th blind decoding does not exceed a blind decoding capability reported by the PDCCH repetition apparatus, X blind decodings are counted for the PDCCH repetitions; where the X-th blind decoding involves combining soft bit information corresponding to the X PDCCH candidates and performing blind decoding on the combined soft bit information, the blind decoding performed on the combined soft bit information is associated with a first search space, the first search space is a predetermined specific search space or a specific search space configured by the network-side device, and the first search space is used for blind decoding on the combined soft bit information.

In a possible implementation, M search space association groups are transmitted in one same transmission unit, where each search space association group includes X search spaces, and the X search spaces are in one-to-one correspondence to the X PDCCH candidates. Each search space association group includes K PDCCH candidate sets, and each PDCCH candidate set includes X PDCCH candidates. A total quantity of PDCCH candidate sets transmitted in one transmission unit is H. A value of M is determined by any one of the following: a preset value and a value determined by the network-side device based on a capability reported by the PDCCH repetition apparatus. A value of K is determined by any one of the following: a preset value and a value determined by the network-side device based on the capability reported by the PDCCH repetition apparatus. A value of H is determined by any one of the following: a preset value and a value determined by the network-side device based on the capability reported by the PDCCH repetition apparatus.

In a possible implementation, the execution module 62 is specifically configured to: in a case that any one of the X PDCCH candidates satisfies a first condition, determine the X PDCCH candidates as a repetition transmission; and execute the overbooking rule based on the assumed first blind decoding count on the X PDCCH candidates, where the first condition is that a time-frequency resource of any one of the PDCCH candidates overlaps a target time-frequency resource.

In a possible implementation, the target time-frequency resource comprises any one of the following: time-frequency resource for synchronization signal block SSB, time-frequency resource for cell-specific reference signal CRS configured via higher layer, time-frequency resource on which rate matching is implemented for other physical downlink shared channels PDSCHs, and unusable time-frequency resource configured via higher layer.

In a possible implementation, the execution module 62 is further configured to: in a case that a second condition is satisfied, monitor the X PDCCH candidates and Y PDCCH candidates. The second condition includes: the PDCCH repetition apparatus has reported a target capability, the Y PDCCH candidates are not used for PDCCH repetition, the Y PDCCH candidates are associated with different receive beams, and time domain resources of the Y PDCCHs overlap, where the target capability is a capability of the PDCCH repetition apparatus to simultaneously receive PDCCH candidates associated with different beams.

In a possible implementation, the PDCCH repetition apparatus further includes an obtaining module. The obtaining module is configured to obtain BWP switch indication signaling. The execution module 62 is specifically configured to execute a BWP switch procedure according to the BWP switch indication signaling obtained by the obtaining module and the time domain resource of the target PDCCH candidate, where the target PDCCH candidate is the last PDCCH candidate in terms of time domain resource in the X PDCCH candidates.

In a possible implementation, the execution module is specifically configured for the PDCCH repetition apparatus to execute the BWP switch procedure after a first time length from a transmission start time point of a transmission unit in which the target PDCCH candidate is located; in a case that the X PDCCH candidates satisfy a third condition and a time domain resource occupied by the target PDCCH candidate in one transmission unit exceeds a first threshold, for the PDCCH repetition apparatus to execute the BWP switch procedure after a first time length from a transmission start time point of a first transmission unit; in a case that the X PDCCH candidates satisfy a third condition and a time offset between a first time point of the target PDCCH candidate and a first time point of a second PDCCH candidate is greater than a second threshold, for the PDCCH repetition apparatus to execute the BWP switch procedure after a first time length from a transmission start time point of a first transmission unit; or in a case that the X PDCCH candidates satisfy a fourth condition, for the PDCCH repetition apparatus to execute the BWP switch procedure after a second time length from a transmission start time point of a second transmission unit or after a first time length from a transmission start time point of a first transmission unit; where the first transmission unit is a transmission unit in which a second PDCCH candidate is located; the second PDCCH candidate is the 1st PDCCH candidate in terms of time domain resource in the X PDCCH candidates; the first time point includes any one of the following: a transmission start time point and a transmission end time point; the second transmission unit is a transmission unit in which the target PDCCH candidate is located; the first time length includes a preset switch delay time and a preset time length; and the second time length includes the preset switch delay time.

In a possible implementation, the third condition is that the X PDCCH candidates are transmitted in one same transmission unit; the fourth condition is that the X PDCCH candidates are transmitted in different transmission units; and the second threshold is a threshold reported by the PDCCH repetition apparatus to the network-side device.

In a possible implementation, the PDCCH repetition apparatus further includes an obtaining module. The obtaining module is configured to obtain first signaling, where the first signaling includes any one of the following: secondary cell dormancy indication signaling and semi-persistent PDSCH scheduling release indication signaling. The execution module 62 is specifically configured to transmit acknowledgment information to the network-side device based on the first signaling obtained by the obtaining module and the time domain resource of the target PDCCH candidate, where the target PDCCH candidate is the last PDCCH candidate in terms of time domain resource in the X PDCCH candidates.

In a possible implementation, the execution module 62 is specifically configured to transmit the acknowledgment information to the network-side device after J symbols from an end symbol of the target PDCCH candidate in terms of time domain resource, J being a positive integer.

In a possible implementation, the PDCCH repetition apparatus further includes an obtaining module. The obtaining module is configured to obtain PDSCH scheduling signaling. The execution module 62 is specifically configured to determine a PDSCH scheduling pattern based on the PDSCH scheduling signaling and the time domain resource of the target PDCCH candidate, where a start symbol of the target PDCCH candidate in terms of time domain resource and a start symbol of the PDSCH in terms of time domain resource are transmitted in one same transmission unit. The target PDCCH candidate includes any one of the following: the 1st PDCCH candidate or last PDCCH candidate in terms of time domain resource in the X PDCCH candidates; a PDCCH candidate associated with a search space with a largest index value or PDCCH candidate associated with a search space with a smallest index value in the X PDCCH candidates; and a PDCCH candidate associated with a control resource set with a largest index value or PDCCH candidate associated with a control resource set with a smallest index value in the X PDCCH candidates.

In a possible implementation, in a case that the target PDCCH candidate is the last PDCCH candidate in terms of time domain resource in the X PDCCH candidates, the PDSCH scheduling pattern is determined based on a first parameter value.

In a possible implementation, the first parameter value is specifically used to characterize any one of the following: the start symbol of the PDSCH in terms of time domain resource is advanced by T symbols or delayed by T symbols relative to a location of the start symbol of the target PDCCH candidate in terms of time domain resource, T being a positive integer; and a location of a scheduling start symbol of the PDSCH relative to a target symbol, where a gap between the target symbol and the 1st symbol or last symbol of any one of the X PDCCH candidates in terms of time domain resource is a target value, and the target value is determined by any one of the following: a preset value and a value determined by the network-side device based on a capability reported by the PDCCH repetition apparatus.

In a possible implementation, in a case that the PDSCH employs a first mapping scheme, symbols of the target PDCCH candidate in terms of time domain resource are located in the first R symbols of one same transmission unit, R being a positive integer. In a case that the PDSCH employs a second mapping scheme, the start symbol of the target PDCCH candidate in terms of time domain resource is not later than the start symbol of the PDSCH in terms of time domain resource.

In the PDCCH repetition apparatus provided in this embodiment of this application, because the PDCCH repetition apparatus can execute the overbooking rule based on the assumed first blind decoding count on the X PDCCH candidates to avoid a case in which the blind decoding count on the X PDCCH candidates exceeds the maximum blind decoding count of the PDCCH repetition apparatus, the blind decoding reliability of the PDCCH repetition apparatus can be improved; or because the PDCCH repetition apparatus can execute the target operation based on the time domain resource of the PDCCH candidate satisfying the predetermined condition in the X PDCCH candidates to avoid a case in which the PDCCH repetition apparatus is unable to determine to execute the target operation after a delay time from which time point, the operation execution reliability can be improved. In this way, the operation execution reliability of the PDCCH repetition apparatus can be improved.

The PDCCH repetition apparatus in this embodiment of this application may be an apparatus or an apparatus or electronic device having an operating system, or may be a component, an integrated circuit, or a chip in a terminal. The apparatus or electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The PDCCH repetition apparatus provided in this embodiment of this application can implement the processes that are implemented in the method embodiments of FIG. 1 and FIG. 7, with the same technical effects achieved. To avoid repetition, details are not described herein again.

Figure 9:
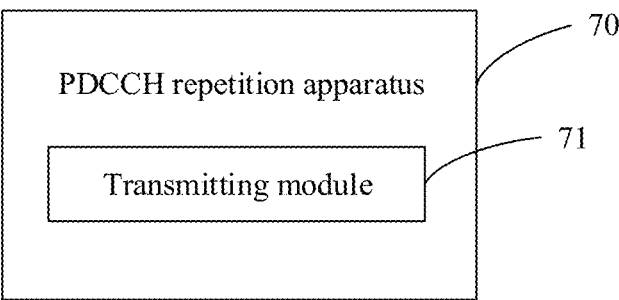
FIG. 9 is a second schematic diagram of a PDCCH repetition apparatus according to an embodiment of this application.

FIG. 9 is a possible schematic structural diagram of a PDCCH repetition apparatus according to involved in an embodiment of this application. The PDCCH repetition apparatus is a network-side device. As shown in FIG. 9, the PDCCH repetition apparatus 70 may include a transmitting module 71.

The transmitting module 71 is configured to: transmit X PDCCH candidates of repetition to UE; and transmit an assumed first blind decoding count on the X PDCCH candidates to the UE.

In a possible implementation, the PDDCH repetition apparatus further includes a receiving module and a determining module. The receiving module is configured to receive a blind decoding count reported by the UE for decoding PDCCH repetition. The determining module is configured to determine the first blind decoding count based on the blind decoding count for decoding PDCCH repetition.

A network-side device embodiment corresponds to a terminal-side embodiment. All the implementations of the terminal-side embodiment are applicable to the network-side device embodiment, with the same technical effects achieved. Details are not described herein again.

The PDCCH repetition apparatus in this embodiment of this application may be an apparatus or an apparatus or electronic device having an operating system, or may be a component, an integrated circuit, or a chip in a terminal. The apparatus or electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

Figure 10:
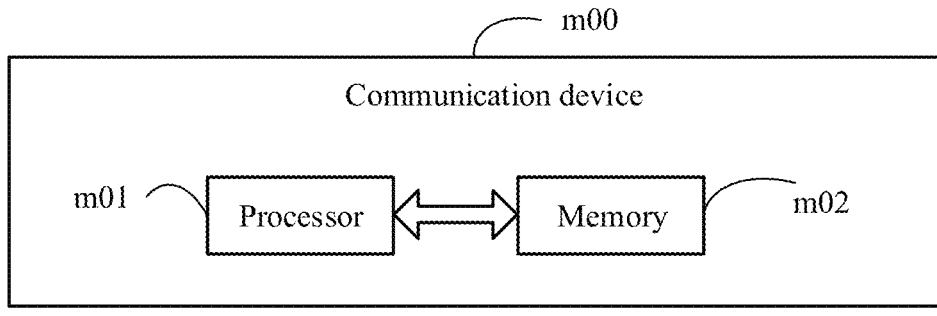
FIG. 10 is a schematic diagram of a communication device according to an embodiment of this application.

Optionally, as shown in FIG. 10, an embodiment of this application further provides a communication device m00 including a processor m01, a memory m02, and a program or instructions stored in the memory m02 and capable of running on the processor m01. For example, when the communication device m00 is a terminal and when the program or the instructions are executed by the processor m01, the processes of the foregoing PDCCH repetition method embodiments are implemented, with the same technical effects achieved. When the communication device m00 is a network-side device and when the program or the instructions are executed by the processor m01, the processes of the foregoing PDCCH repetition method embodiments are implemented, with the same technical effects achieved. To avoid repetition, details are not described herein again.

Figure 11:
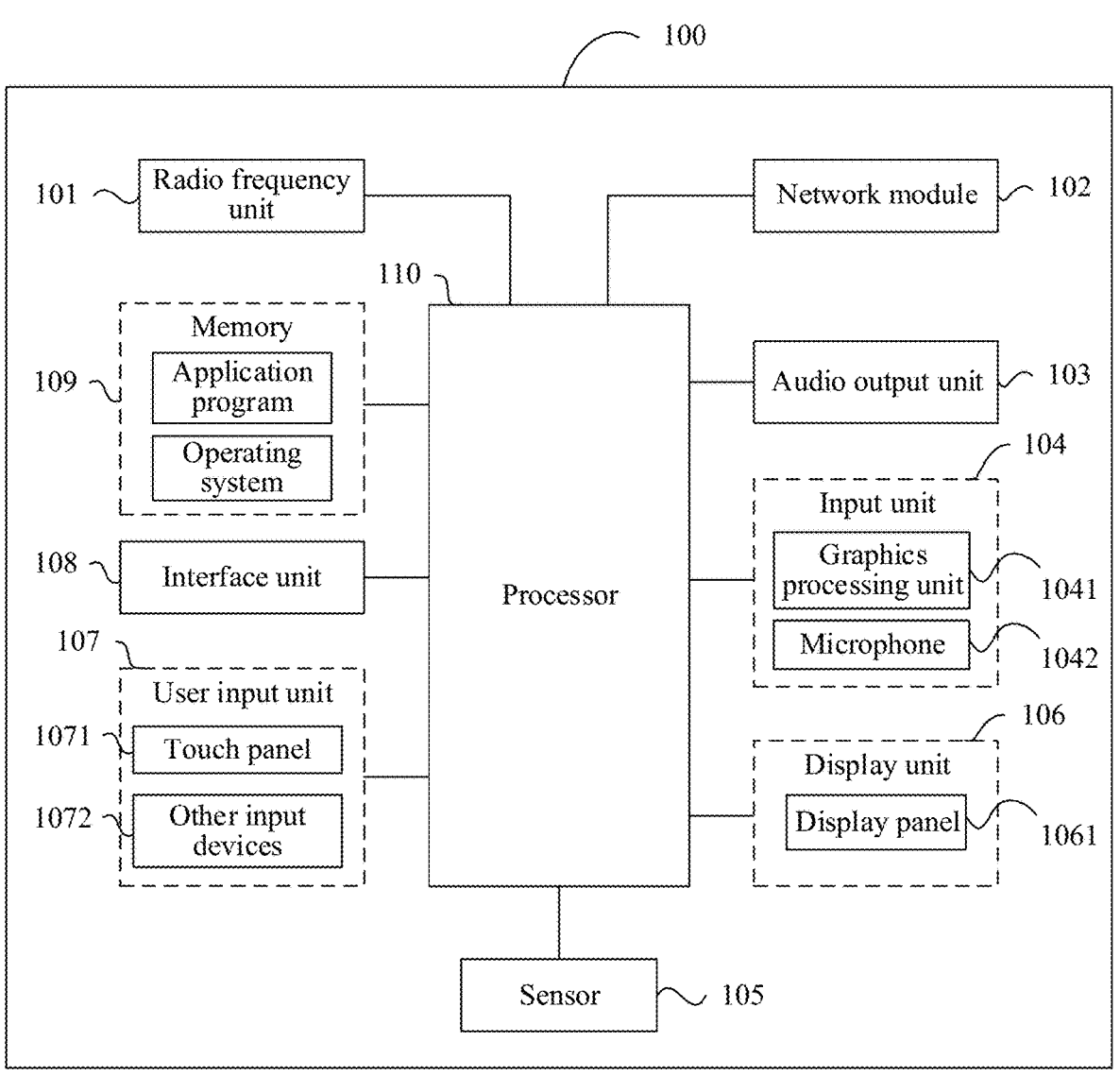
FIG. 11 is a schematic diagram of a hardware structure of UE according to an embodiment of this application.

An embodiment of this application further provides a terminal including a processor and a communication interface, where the processor is configured for UE to: in a case that UE has received information for physical downlink control channel PDCCH repetition, determine X PDCCH candidates of repetition, X being an integer greater than 1; and execute an overbooking rule based on an assumed first blind decoding count on the X PDCCH candidates, or execute a target operation based on a time domain resource of a target PDCCH candidate. It should be noted that this terminal embodiment corresponds to the terminal-side method embodiment. All implementation processes and implementations of the foregoing method embodiment are applicable to the terminal embodiment, with the same technical effects achieved. Specifically, FIG. 11 is a schematic diagram of a hardware structure of UE for implementing an embodiment of this application.

The terminal 100 includes but is not limited to at least some of components such as a radio frequency unit 101, a network module 102, an audio output unit 103, an input unit 104, a sensor 105, a display unit 106, a user input unit 107, an interface unit 108, a memory 109, and a processor 110.

It can be understood by those skilled in the art that the terminal 100 may further include a power supply (for example, a battery) supplying power to the components. The power supply may be logically connected to the processor 110 via a power management system, so that functions such as charge management, discharge management, and power consumption management are implemented by using the power management system. The structure of the terminal shown in FIG. 11 does not constitute any limitation on the terminal, and the terminal may include more or fewer components than shown in the figure, or combine some of the components, or have different arrangements of the components. Details are not described herein.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display, an organic light-emitting diode display, or the like. The user input unit 107 includes a touch panel 1071 and other input devices 1072. The touch panel 1071 is also referred to as a touch-screen. The touch panel 1071 may include two parts: a touch detection apparatus and a touch controller. The other input devices 1072 may include but are not limited to a physical keyboard, a functional button (for example, a volume control button or a power on/off button), a trackball, a mouse, and a joystick. Details are not described herein.

In this embodiment of this application, the radio frequency unit 101 transmits downlink data received from a network-side device to the processor 110 for processing, and in addition, transmits uplink data to the network-side device. Generally, the radio frequency unit 101 includes but is not limited to an antenna, at least one amplifier, a transceiver, a coupler, a low noise amplifier, and a duplexer.

The memory 109 may be configured to store software programs or instructions and various data. The memory 109 may mainly include a program or instruction storage area and a data storage area. The program or instruction storage area may store an operating system, an application program or instructions required by at least one function (for example, a sound playback function or an image playback function), and the like. In addition, the memory 109 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other volatile solid-state storage device.

The processor 110 may include one or more processing units. Optionally, an application processor and a modem processor may be integrated in the processor 110. The application processor primarily processes an operating system, user interfaces, application programs or instructions, and the like. The modem processor primarily processes radio communication, for example, being a baseband processor. It can be understood that the modem processor may alternatively be not integrated in the processor 110.

The processor 110 is configured for UE to: in a case that UE has received information for physical downlink control channel PDCCH repetition, determine X PDCCH candidates of repetition, X being an integer greater than 1; and for the UE to execute an overbooking rule based on an assumed first blind decoding count on the X PDCCH candidates, or for the UE to execute a target operation based on a time domain resource of a target PDCCH candidate.

Search spaces corresponding to the X PDCCH candidates are associated with each other, and the target PDCCH candidate is a PDCCH candidate satisfying a predetermined condition in the X PDCCH candidates.

Because the UE can execute the overbooking rule based on the assumed first blind decoding count on the X PDCCH candidates to avoid a case in which the blind decoding count on the X PDCCH candidates exceeds a maximum blind decoding count of the UE, the blind decoding reliability of the UE can be improved; or because the UE can execute the target operation based on the time domain resource of the PDCCH candidate satisfying the predetermined condition in the X PDCCH candidates to avoid a case in which the UE is unable to determine to execute the target operation after a delay time from which time point, the operation execution reliability can be improved. In this way, the operation execution reliability of the UE can be improved.

An embodiment of this application further provides a network-side device including a processor and a communication interface, where the communication interface is configured to: transmit X PDCCH candidates of repetition to UE; and transmit an assumed first blind decoding count on the X PDCCH candidates to the UE. It should be noted that this network-side device embodiment corresponds to the foregoing network-side device method embodiment. All implementation processes and implementations of the foregoing method embodiment are applicable to this network-side device embodiment, with the same technical effects achieved.

Figure 12:
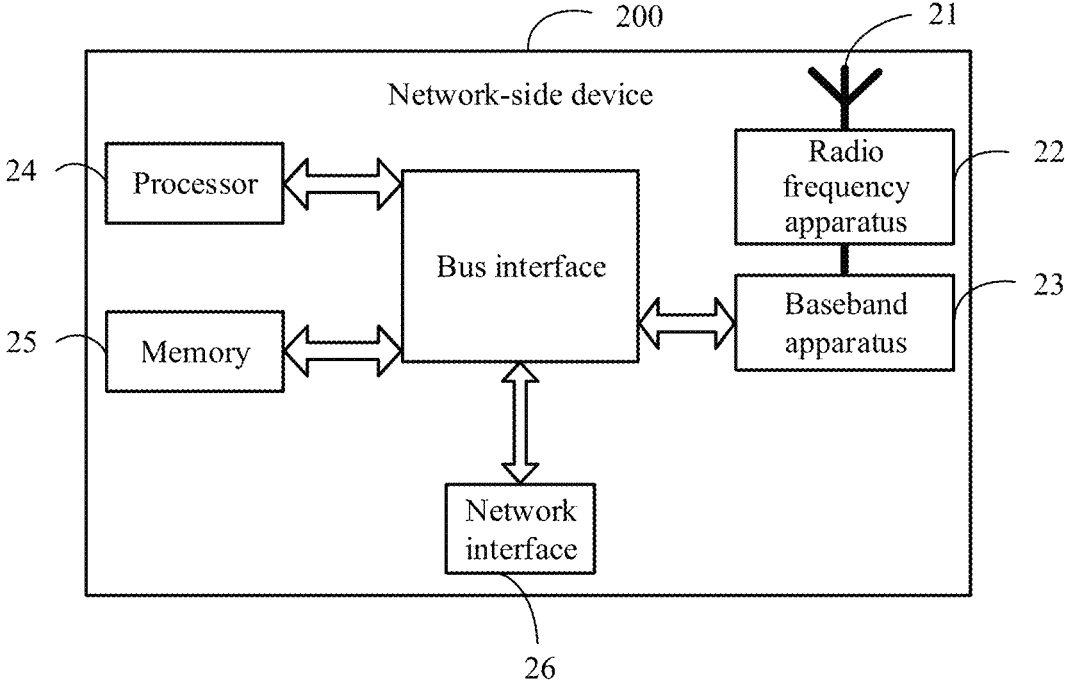
FIG. 12 is a schematic diagram of a hardware structure of a network-side device according to an embodiment of this application.

Specifically, an embodiment of this application further provides a network-side device. As shown in FIG. 12, the network-side device 200 includes an antenna 21, a radio frequency apparatus 22, and a baseband apparatus 23. The antenna 21 is connected to the radio frequency apparatus 22. In an uplink direction, the radio frequency apparatus 22 receives information by using the antenna 21, and transmits the received information to the baseband apparatus 23 for processing. In a downlink direction, the baseband apparatus 23 processes to-be-transmitted information, and transmits the information to the radio frequency apparatus 22; and the radio frequency apparatus 22 processes the received information and then transmits the information by using the antenna 21.

The frequency band processing apparatus may be located in the baseband apparatus 23. The method executed by the network-side device in the foregoing embodiments may be implemented in the baseband apparatus 23, and the baseband apparatus 23 includes a processor 24 and a memory 25.

The baseband apparatus 23 may include, for example, at least one baseband board, where a plurality of chips are disposed on the baseband board. As shown in FIG. 12, one of the chips is, for example, the processor 24, connected to the memory 25, to invoke a program in the memory 25 to execute the operation of the network-side device shown in the foregoing method embodiments.

The baseband apparatus 23 may further include a network interface 26 configured to exchange information with the radio frequency apparatus 22, where the interface is, for example, a common public radio interface (CPRI for short).

Specifically, the network-side device in this embodiment of the present invention further includes instructions or a program stored in the memory 25 and capable of running on the processor 24. The processor 24 invokes the instructions or program in the memory 25 to execute the method executed by the modules shown in FIG. 9, with the same technical effects achieved. To avoid repetition, details are not described herein again.

An embodiment of this application further provides a readable storage medium, where the readable storage medium stores a program or instructions, and when the program or instructions are executed by a processor, the processes of the foregoing PDCCH repetition method embodiments are implemented, with the same technical effects achieved. To avoid repetition, details are not described herein again.

The processor is a processor in the terminal described in the foregoing embodiments. The readable storage medium includes a computer-readable storage medium, such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the foregoing PDCCH repetition method embodiments, with the same technical effects achieved. To avoid repetition, details are not repeated herein.

It should be understood that the chip mentioned in this embodiment of this application may also be referred to as a system-level chip, a system chip, a chip system, a system-on-chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to execute the method described in the embodiments of this application.

The foregoing describes the embodiments of this application with reference to the accompanying drawings. However, this application is not limited to the foregoing specific implementations. These specific implementations are merely for illustration rather than limitation. Inspired by this application, persons of ordinary skill in the art may develop many other forms which do not depart from the essence of this application and the protection scope of the claims, and all such forms shall fall within the protection scope of this application.

What is claimed is:

1. A physical downlink control channel (PDCCH) repetition method, wherein the method comprises:

in a case that any one of X physical downlink control channel (PDCCH) candidates received by a user equipment (UE) satisfies a first condition, determining, by the UE, that the X PDCCH candidates as a repetition transmission, wherein X is an integer greater than 1, and the first condition comprises: a time-frequency resource of any one of the X PDCCH candidates overlaps a target time-frequency resource; and determining, by the UE, a blind decoding count for the X PDCCH candidates for the repetition transmission based on an assumed first blind decoding count on the X PDCCH candidates; wherein search spaces corresponding to the X PDCCH candidates are associated with each other;

the target time-frequency resource comprises any one of the following: time-frequency resource for synchronization signal block SSB, time-frequency resource for cell-specific reference signal (CRS) configured via higher layer, time-frequency resource on which rate matching is implemented for other physical downlink shared channels (PDSCHs), and unusable time-frequency resource configured via higher layer.

2. The method according to claim 1, wherein the first blind decoding count is determined based on any one of the following:

a default assumed blind decoding count for demodulating PDCCH repetition;

a blind decoding count reported by the UE for demodulating PDCCH repetition; and a blind decoding count determined by a network-side device based on the blind decoding count reported by the UE for demodulating PDCCH repetition.

3. The method according to claim 1, wherein the determining, by the UE, a blind decoding count for the X PDCCH candidates for the repetition transmission based on an assumed first blind decoding count on the X PDCCH candidates comprises:

determining, by the UE, the blind decoding count for the X PDCCH candidates for the repetition transmission based on the first blind decoding count and according to a predetermined rule.

4. The method according to claim 3, wherein the predetermined rule comprises any one of the following:

each PDCCH candidate in the X PDCCH candidates is associated with a different search space; and for a PDCCH candidate associated with a search space with a small index value, counting is based on a third blind decoding count, and for a PDCCH candidate associated with a search space with a large index value, counting is based on a fourth blind decoding count, wherein the fourth blind decoding count is greater than or equal to the third blind decoding count.

5. The method according to claim 4, wherein in a case that all PDCCH candidates in the X PDCCH candidates are transmitted in one same transmission unit and the X PDCCH candidates do not completely overlap in terms of time domain resource, the last symbol of a PDCCH candidate associated with a search space with a larger index value is later than the last symbol of a PDCCH candidate associated with a search space with a smaller index value; or the 1st symbol of a PDCCH candidate associated with a search space with a larger index value is later than the 1st symbol of a PDCCH candidate associated with a search space with a smaller index value.

6. The method according to claim 3, wherein the predetermined rule comprises any one of the following:

in a case that the first blind decoding count is equal to X, one blind decoding is counted for each PDCCH candidate, and if the X-th blind decoding exceeds a blind decoding capability reported by the UE, X−1 blind decodings are counted for the PDCCH repetitions; and in a case that the first blind decoding count is equal to X, one blind decoding is counted for each PDCCH candidate, and if the X-th blind decoding does not exceed the blind decoding capability reported by the UE, X blind decodings are counted for the PDCCH repetitions; wherein the X-th blind decoding involves combining soft bit information corresponding to the X PDCCH candidates and performing blind decoding on the combined soft bit information, the blind decoding performed on the combined soft bit information is associated with a first search space, and the first search space is a predetermined specific search space or a specific search space configured by a network-side device, and the first search space is used for blind decoding on the combined soft bit information.

7. The method according to claim 1, wherein

M search space association groups are transmitted in one same transmission unit, each search space association group comprises X search spaces, and the X search spaces are in one-to-one correspondence to the X PDCCH candidates;

each search space association group comprises K PDCCH candidate sets, and each PDCCH candidate set comprises X PDCCH candidates; and a total quantity of PDCCH candidate sets transmitted in one transmission unit is H; wherein a value of M is determined by any one of the following: a preset value and a value determined by a network-side device based on a capability reported by the UE; a value of K is determined by any one of the following: a preset value and a value determined by the network-side device based on the capability reported by the UE; and a value of H is determined by any one of the following: a preset value and a value determined by the network-side device based on the capability reported by the UE.

8. The method according to claim 1, wherein after the determining, by the UE, a blind decoding count for the X PDCCH candidates for the repetition transmission based on an assumed first blind decoding count on the X PDCCH candidates, the method further comprises:

in a case that a second condition is satisfied, monitoring, by the UE, the X PDCCH candidates and Y PDCCH candidates, wherein the second condition comprises: the UE has reported a target capability, the Y PDCCH candidates are not used for PDCCH repetition, the Y PDCCH candidates are associated with different receive beams, and time domain resources of the Y PDCCHs overlap, the target capability being a capability of the UE to simultaneously receive PDCCH candidates associated with different beams.

9. A PDCCH repetition method, wherein the method comprises:

transmitting, by a network-side device, X PDCCH candidates of repetition to UE; and transmitting, by the network-side device, an assumed first blind decoding count on the X PDCCH candidates to the UE;

wherein in a case that any one of the X PDCCH candidates satisfies a first condition, the X PDCCH candidates are determined as a repetition transmission, X being an integer greater than 1, and the first condition comprises: a time-frequency resource of any one of the X PDCCH candidates overlaps a target time-frequency resource;

wherein the assumed first blind decoding count on the X PDCCH candidates is used for the UE to determine a blind decoding count for the X PDCCH candidates for the repetition transmission;

wherein search spaces corresponding to the X PDCCH candidates are associated with each other;

the target time-frequency resource comprises any one of the following: time-frequency resource for synchronization signal block SSB, time-frequency resource for cell-specific reference signal (CRS) configured via higher layer, time-frequency resource on which rate matching is implemented for other physical downlink shared channels (PDSCHs), and unusable time-frequency resource configured via higher layer.

10. The method according to claim 9, wherein before the transmitting, by the network-side device, an assumed first blind decoding count on the X PDCCH candidates to the UE, the method further comprises:

receiving, by the network-side device, a blind decoding count reported by the UE for decoding PDCCH repetition; and determining, by the network-side device, the first blind decoding count based on the blind decoding count for decoding PDCCH repetition.

11. UE, comprising a processor, a memory, and a program or instructions stored in the memory and capable of running on the processor, wherein when the program or instructions are executed by the processor, the process is caused to implement:

in a case that any one of X physical downlink control channel (PDCCH) candidates received by a user equipment (UE) satisfies a first condition, determining, by the UE, that the X PDCCH candidates as a repetition transmission, wherein X is an integer greater than 1, and the first condition comprises: a time-frequency resource of any one of the X PDCCH candidates overlaps a target time-frequency resource; and determining, by the UE, a blind decoding count for the X PDCCH candidates for the repetition transmission based on an assumed first blind decoding count on the X PDCCH candidates; wherein search spaces corresponding to the X PDCCH candidates are associated with each other;

the target time-frequency resource comprises any one of the following: time-frequency resource for synchronization signal block SSB, time-frequency resource for cell-specific reference signal (CRS) configured via higher layer, time-frequency resource on which rate matching is implemented for other physical downlink shared channels (PDSCHs), and unusable time-frequency resource configured via higher layer.

12. The UE according to claim 11, wherein the first blind decoding count is determined based on any one of the following:

a default assumed blind decoding count for demodulating PDCCH repetition;

a blind decoding count reported by the UE for demodulating PDCCH repetition; and a blind decoding count determined by a network-side device based on the blind decoding count reported by the UE for demodulating PDCCH repetition.

13. The UE according to claim 11, wherein the determining, by the UE, a blind decoding count for the X PDCCH candidates for the repetition transmission based on an assumed first blind decoding count on the X PDCCH candidates comprises:

determining, by the UE, the blind decoding count for the X PDCCH candidates for the repetition transmission based on the first blind decoding count and according to a predetermined rule.

14. The UE according to claim 13, wherein the predetermined rule comprises any one of the following:

each PDCCH candidate in the X PDCCH candidates is associated with a different search space; and for a PDCCH candidate associated with a search space with a small index value, counting is based on a third blind decoding count, and for a PDCCH candidate associated with a search space with a large index value, counting is based on a fourth blind decoding count, wherein the fourth blind decoding count is greater than or equal to the third blind decoding count.

15. The UE according to claim 14, wherein in a case that all PDCCH candidates in the X PDCCH candidates are transmitted in one same transmission unit and the X PDCCH candidates do not completely overlap in terms of time domain resource, the last symbol of a PDCCH candidate associated with a search space with a larger index value is later than the last symbol of a PDCCH candidate associated with a search space with a smaller index value; or the 1st symbol of a PDCCH candidate associated with a search space with a larger index value is later than the 1st symbol of a PDCCH candidate associated with a search space with a smaller index value.

16. The UE according to claim 13, wherein the predetermined rule comprises any one of the following:

in a case that the first blind decoding count is equal to X, one blind decoding is counted for each PDCCH candidate, and if the X-th blind decoding exceeds a blind decoding capability reported by the UE, X–1 blind decodings are counted for the PDCCH repetitions; and in a case that the first blind decoding count is equal to X, one blind decoding is counted for each PDCCH candidate, and if the X-th blind decoding does not exceed the blind decoding capability reported by the UE, X blind decodings are counted for the PDCCH repetitions;

wherein the X-th blind decoding involves combining soft bit information corresponding to the X PDCCH candidates and performing blind decoding on the combined soft bit information, the blind decoding performed on the combined soft bit information is associated with a first search space, and the first search space is a predetermined specific search space or a specific search space configured by a network-side device, and the first search space is used for blind decoding on the combined soft bit information.

17. The UE according to claim 11, wherein

M search space association groups are transmitted in one same transmission unit, each search space association group comprises X search spaces, and the X search spaces are in one-to-one correspondence to the X PDCCH candidates;

each search space association group comprises K PDCCH candidate sets, and each PDCCH candidate set comprises X PDCCH candidates; and a total quantity of PDCCH candidate sets transmitted in one transmission unit is H; wherein a value of M is determined by any one of the following: a preset value and a value determined by a network-side device based on a capability reported by the UE; a value of K is determined by any one of the following: a preset value and a value determined by the network-side device based on the capability reported by the UE; and a value of H is determined by any one of the following: a preset value and a value determined by the network-side device based on the capability reported by the UE.

18. The UE according to claim 11, wherein after the determining, by the UE, a blind decoding count for the X PDCCH candidates for the repetition transmission based on an assumed first blind decoding count on the X PDCCH candidates, the process is further caused to implement:

in a case that a second condition is satisfied, monitoring, by the UE, the X PDCCH candidates and Y PDCCH candidates, wherein the second condition comprises: the UE has reported a target capability, the Y PDCCH candidates are not used for PDCCH repetition, the Y PDCCH candidates are associated with different receive beams, and time domain resources of the Y PDCCHs overlap, the target capability being a capability of the UE to simultaneously receive PDCCH candidates associated with different beams.

* * * * *